United States Patent Office 3,138,185
Patented June 23, 1964

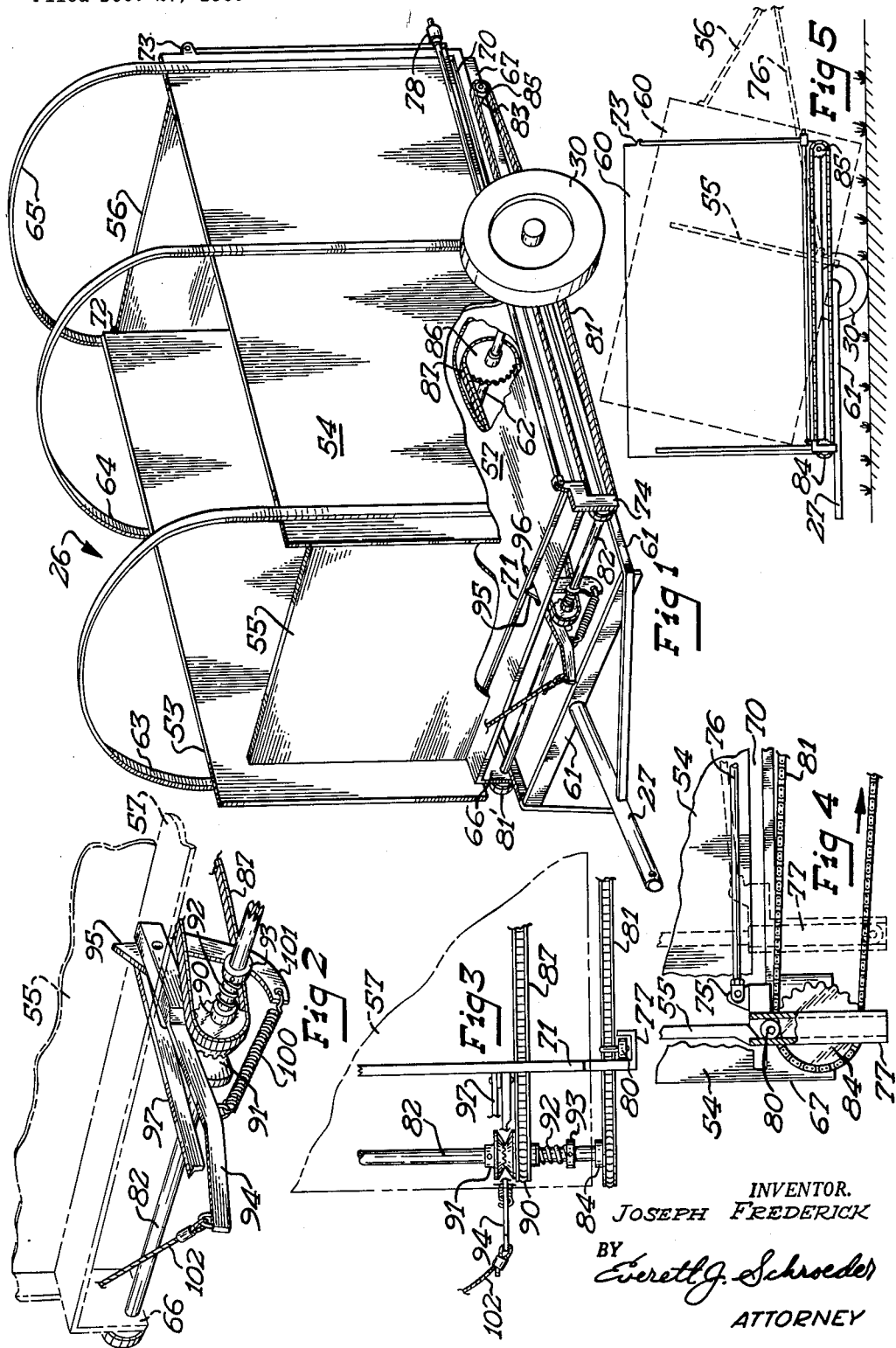

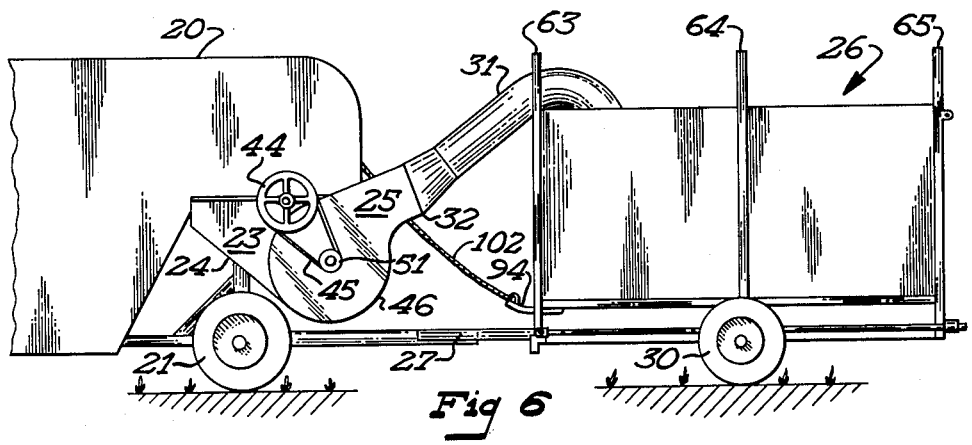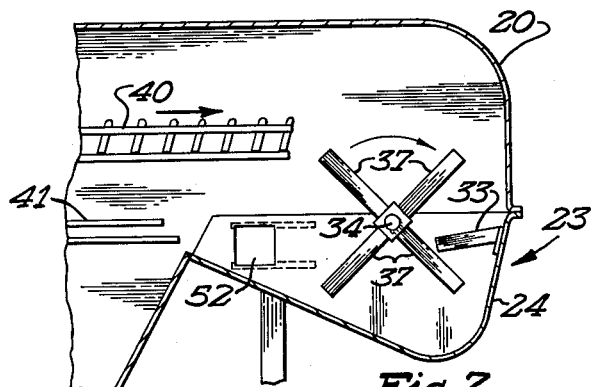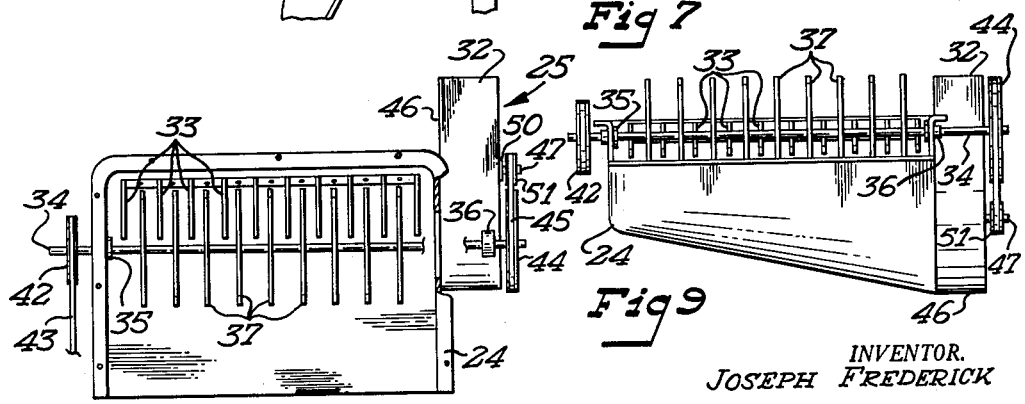

3,138,185
STRAW CONSERVING APPARATUS
Joseph Frederick, Box 291, Richardton, N. Dak.
Filed Dec. 27, 1960, Ser. No. 78,432
5 Claims. (Cl. 146—107)

This invention relates to the field of farm implements and more particularly to apparatus for the conservation of straw.

Various methods have been devised to get rid of the straw after it has been combined because in the past it has appeared to present a problem to the farmer. One method of disposing of the straw after it has been combined is to windrow the straw by letting it fall from the combine as the crop is harvested. The windrowed straw is then sometimes burned in the windrows or raked into larger piles for easier burning or, if desired, the straw may be collected for baling. Others merely let the spreader at the rear of the combine spread the straw about the field and then plow it under as fertilizer.

However, the problem of conserving the straw has become quite important in recent years in certain parts of the country where feed such as hay and forage feeds are scarce. Furthermore, due to the advances made in new feeding methods and new feed supplements, the conservation of the straw of harvested crops for use as a form of feed has become a prime consideration.

Coupled with the fact, that if a satisfactory means of conserving the straw can be devised, where the straw is not spread over a field but rather deposited in one place in a field or hauled off the field, the problem of getting rid of weeds in the field is also greatly aided because generally the weed seeds are discharged from a combine with the straw and chaff. In fact, the problem has become so acute that many States have established separate commissions to deal with the problem of getting rid of noxious weeds and preventing the spread of these weeds.

It is therefore a general object of the present invention to provide improved straw conserving apparatus.

It is another object of this invention to provide novel straw conserving apparatus which is readily adaptable to be attached to a combine.

It is a further object of the present invention to provide novel apparatus for chopping the straw into small segments and discharging it from the apparatus.

It is still another object of this invention to provide novel, simple, and inexpensive means for receiving and transporting the chopped straw to a particular location in a field.

It is yet another object of the present invention to provide a novel straw receiving and transporting means with movable end-gates to aid in discharging the chopped straw and inert matter discharged from the combine at a central location.

It is still a further object of the present invention to provide novel and improved means for blowing the chopped straw and inert matter to pass to the blower.

It is another object of this invention to provide novel and improved means for chopping the straw only as it passes from the combine while allowing the inert matter to pass to the blower.

It is a further object of the present invention to provide novel and improved means for discharging the straw from the transporting means when the chopped straw and inert matter is to be discharged.

It is another object of the present invention to provide new and improved chopping apparatus which is uniquely constructed and arranged and is attached to a combine and driven by combine power, for chopping straw discharged from the combine.

These and other objects and features of my invention will become more apparent from the detailed description set forth in the specification and drawings in which:

FIG. 1 is a plan view, partially sectioned, of a trailer to be attached to the combine for receiving the chopped straw and inert matter in which the front end-gate, side, and floor are shown cut away to expose details of the driving mechanism;

FIG. 2 is a section view of the forward part of the trailer showing in detail, the clutch assembly;

FIG. 3 is a top view of the clutch assembly and shows a guide and follower attached to the front end-gate;

FIG. 4 is a side view of the chain belt drive and follower attached thereto to drive the front end-gate;

FIG. 5 is a side elevation view of the trailer in its normal attitude and in an attitude where the chopped straw and inert matter are being dumped from the trailer;

FIG. 6 is a side elevation view of my invention showing the coacting operation of the chopper and trailer attached to the combine;

FIG. 7 is a cutaway view from the side, of the straw chopper showing the placement of the fixed and rotating knives relative to the shaker elements;

FIG. 8 is a top view of the chopper and blower showing the coaction of the fixed and rotating knives; and FIG. 9 is an elevation view of the chopper and blower showing the sloping housing of the chopper.

The rear portion of a combine 20 is shown supported by a wheel 21 (FIG. 6) and this is shown by way of illustration only as it will be understood that any type of combine may use the present invention. Attached to the straw and chaff discharge opening of combine 20 is an outer housing 24 of a straw chopper 23, and attached to one end of housing 24, is a blower 25. Blower 25 has several blades, generally of rather heavy construction to aid in maintaining a constant speed, and admits the straw and inert material such as chaff and weed seeds at the side of the fan attached to housing 24. A trailer 26 is connected to combine 20 by a hitch 27 and is supported for movement by a pair of wheels 30 and 30' (wheel 30' not being shown). A flexible conveyor 31 is connected between a discharge outlet 32 of blower 25 and trailer 26.

Housing 24 has a plurality of fixed knives 33 attached to the rearmost side of housing 24 and near the topmost edge of housing 24, where it is attached to combine 20. Knives 33 are tilted downward at an angle of about 30 degrees so that if a "slug" of green straw or weeds should fall on the knives it will more likely pass through the space between the knives and not tend to plug the device. A shaft 34 is rotatably supported by a pair of bearings 35 and 36 located in housing 24 near the upper edge of the housing 24 and near the rearward edge so that a plurality of knives 37 attached thereto cooperates with, and rotate between knives 33 to chop the straw into small bits or segments. Since knives 33 are inclined downward, knives 37, in being rotated clockwise as seen from the blower end of housing 24, produce a better scissors action to cut the straw into small pieces. It will be further noted that knives 37 are essentially straight bars supported at the center by shaft 34 and sharpened at the leading edges. Knives 37 are spaced about two to three inches apart along shaft 34, but in equal spacings and situated so that they rotate between knives 33 which are spaced the same distance apart along the back edge of housing 24. Furthermore, knives 37 are alternately rotated ninety degrees from the adjacent knices on shaft 34. This is best shown in FIGS. 8 and 9 by observing that the ends of the knives at their extreme radius are visible on some of the knives 37 but not the others for the reason that some are rotated ninety degrees.

It was also found that the best chopping results were obtained where the vertical location of knives 33 and shaft 34, is between the plurality of shaker elements 40 and the plurality of sieve elements 41 of combine 20. In other words, the best operation of the chopper was obtained when knives 33 and shaft 34 were above sieve elements 41 but below shaker elements 40, so that the straw was directed down over knives 37 and the sieved material passed therebelow. In regards to their horizontal location, they are mounted to the rear of shaker elements 40 and sieve elements 41. Shaft 34 has a pulley 42 attached thereto which is driven by a belt 43 driven by the spreader pulley (not shown) which is part of the combine and provides power to move shaker elements 40, through a shaker shaft. The other end of shaft 34 has a pulley 44 attached thereto, which in turn drives a belt 45. Relatively speaking, pulley 42 is considerably smaller than the spreader pulley, and pulley 44, but of course these pulleys may take on different diameters to obtain the best results possible.

Blower 25 has an outer housing 46 which is attached to chopper housing 24 on the side opposite the spreader pulley and pulley 42. In fact, the blower housing 46 is situated near the lowermost portion of chopper housing 24 so that the chopper housing is slanted downward from the side that supports bearing 35 (FIG. 9). The fact that the lowermost part of housing 24 slants toward blower housing 46, aids in moving the chopped straw and inert matter such as weed seeds and chaff towards the blower 25. A shaft 47 is supported by a bearing 50 which carries the fan blades of blower 25 and situated on the end of shaft 47 is a pulley 51. Pulley 51 is driven by belt 45 and pulley 44, so that the fan blades rotate at a relatively high speed to produce a stream of chopped straw and inert matter moving at a relatively high speed.

It is also important to note that the blower 25 is located to one side of chopper housing 24 so that the grain moving along the upper surface of the sieves will not be sucked into the blower and discharged with the straw. If the blower were located in the middle of the chopper housing 24, the latter undesirable result would be obtained. To further aid in the control of the chopped straw and inert matter which is to be blown out of blower 25, an air inlet door 52 is provided which is closed to increase the suction of blower 25 when the straw is green and wet, and opened when the straw is dry. This door is located in housing 24, forward of shaft 34 and on the end opposite blower 25.

Referring now to FIGS. 1–5, it will be seen that trailer 26 has a pair of sides 53 and 54, a movable front end-gate 55 and a movable rear end-gate 56, all communicating with a floor 57 to form a box 60. Trailer hitch 27 forms a part of a frame 61 which supports a pair of bearings (not shown) that journal a common shaft 62 to which is attached wheels 30 and 30'. Sides 53 and 54 are fixedly attached to floor 57 and three supporting members 63, 64, and 65 are fastened to the sides and form a bow over the top of the box to support a top or cover so that the straw and inert matter is not blown over the fields. The floor 57 has its outer edge extended downward where the sides are joined to form a member 66, and another member 67 which is only partially shown because of the cutaway view of FIG. 1.

Just above the floor on each side is a slot 70 which extends longitudinally in sides 53 and 54 through which a bar 71 moves forward and rearward. End-gate 55 is attached to bar 71 and moves unitarily therewith. Members 66 and 67 on each side of box 60 are pivotally supported by frame 61 at points which are parallel to, and substantially coaxial with, common shaft 62. In other words the trailer box is supported so that it will pivot or balance over the axle or shaft which is supported by the wheels. Rear end-gate 56 is pivotally supported at its upper most edge by a pair of bearings 72 and 73 which are journaled in sides 53 and 54 respectively at their rear edge.

Attached to bar 71, is a pair of members 74 and 74' (member 74' not being shown). Since the members are identical in function and one is on side 53 and the other on side 54, only the one appearing on side 54 will be described, it being understood that the other member is similar except that it is the reverse of 74. An ear 75 is formed on the upper edge of member 74 and a vertical channel portion 77 is welded or made in part of member 74 and extends downward. A rod 76 is connected between ear 75 and the lowermost portion of rear end-gate 56 by passing rod 76 through a bore in end-gate 56 and affixing a spring 78 on the end of rod 76. When end-gate 56 is drawn shut, spring 78 is kept under tension to urge end-gate 56 against sides 53 and 54.

Channel portion 77 of member 74 has a slot on its innermost side with the slot extending vertically parallel with the forward face of front end-gate 55. Situated in this slot is a roller slot-follower 80 which is welded to, or made a part of, a link of a chain belt 81.

Members 66 and 67 support a shaft 82 for rotation near the front edge of sides 53 and 54 and support another shaft 83 for rotation near the rear edge of sides 53 and 54. Shaft 82 has a pair of sprocket gears 84 and 84' fixedly attached to its ends and shaft 83 has a pair of sprocket gears 85 and 85' fixedly attached to its ends.

Common shaft 62 between the wheels, has a sprocket gear 86 attached thereto, about which is rotated a chain belt 87. Chain belt 87 drives a sprocket gear 90 which contains a wedge portion and is free to rotate about shaft 82. The wedge portion of gear 90 contains radial teeth at the shortest radius of the bevel faced gear. Coacting with gear 90 is a second bevel faced gear 91 which is fixedly attached to shaft 82 so that when the gear teeth of the wedge shaped portions mesh, power is transmitted from shaft 62 to shaft 82. To keep gears 90 and 91 in mesh, a compression spring 92 is fitted around shaft 82 and presses against the side of gear 90 and against a collar 93 which encompasses shaft 82 and is fixedly attached thereto. These elements and those about to be described, form a clutch to control the power for driving chain belts 81 and 81'.

In order to disengage the bevel gears 90 and 91, it is necessary to force them apart and this is accomplished by a wedge shaped lever 94 that fits in the V groove formed by gears 90 and 91. Lever 94 has a vertical protrusion 95 which projects upward through the floor 57 in a slot 96 so that it may be engaged by the lowermost edge of front end-gate 55 which is moved by bar 71. A guide block 97 is located adjacent to lever 94 and is fastened underneath the floor 57. It has a slot cut therein which extends longitudinally with the guide block, and has a pin which fits in the slot and is fixedly attached to lever 94 at its end near protrusion 95. As bar 71 forces front end-gate 55 forward, protrusion 95 is engaged and lever 94 is moved forward causing the pin to move forward in the slot of guide block 97. As the pin reaches its most forward position, it stops its travel in the slot, but since the protrusion 95 forms a lever arm with the pin, the lever 94 is rotated downward where the wedge shaped portion forces gears 90 and 91 apart and stops the movement of front-end gate 55. To aid in forcing the two gears apart, lever 94 has a tension spring 100 attached thereto at its lower edge and to an arm 101 which is fixedly attached to floor 57. As the lever 94 moves downward, the tension spring 100 helps pull lever 94 into place to force gears 90 and 91 apart. To trip the clutch into operation at a predetermined point, a rope 102 is provided which is attached to the end of lever 94 and an upward pull will cause gears 90 and 91 to mesh, setting the clutch in motion.

As the combine 10 is moved over the field to be harvested, the straw is shaken from shaker elements 40 and falls downward on top of rotating knives 37 and stationary knives 33 where it is chopped into small segments and moved laterally over the sloping housing floor into blower 25. In like manner, the weed seed and chaff is sucked rearwardly from the sieve elements 41 and is moved along the bottom of housing 24 into blower 25 since it is not necessary that the inert matter coming off the sieve elements be put through the chopper knives 33 and 37. Depending on whether the straw is dry or moist, the air control door 52 is respectively opened or closed and the chopped straw and inert matter is discharged from blower 25 in a relatively high pressure stream where it is directed into trailer 26 by the flexible conveyor or tube 31.

When the box 60 of trailer 26 is filled and ready to be dumped, rope 102 is pulled which removes lever 94 from between gears 90 and 91 and thereby starts chain belts 81, 81', and 87 to rotate. Since slot follower 80 is welded to, or a part of chain belt 81, it is driven first downwardly within channel 77 and then toward the rear of trailer box 60. Because it engages channel member 77 throughout its rearward travel bar 71 and front end-gate 55 are moved rearwardly also. As the front end-gate 55 moves rearward, rod 76 is also moved rearwardly and forces the bottom of rear end-gate 56 to pivot outwardly and upwardly because it is pivoted at the top edge. As the centroid of the chopped straw and inert matter moves past the balance point, box 60 rotates so that the front end is moved upwardly and the rear end is moved downwardly toward the ground to facilitate the discharge of the contents of box 60. By the time the front end-gate 55 reaches the rear end of box 60, rear end-gate 56 is fully extended rearward to allow the contents of box 60 to be discharged.

When slot follower 80 comes adjacent to sprocket gear 85, it moves upwardly over the gear and within channel member 77 until it starts its forward movement where it continues to engage channel member 77 and bring front end-gate 55 forward again. This same motion also rotates rear end-gate 56 back towards its normally closed position.

As front end-gate 55 and bar 71 are moved forward, they engage protrusion 95 extending through the floor in slot 96 and force wedge arm 94 to again separate gears 90 and 91 so that the front end-gate 55 remains stationary and the rear end-gate 56 is closed.

The movement of the front end-gate 55 is about three times as fast as the ground speed of trailer 26 so that the chopped straw and inert matter is substantially jumped in one location and not spread about the field.

From the above it will be readily appreciated that my invention provides a number of distinct advantages for the farmer in that through the use of my apparatus the straw may be readily and easily collected as it is combined and disposed at a central location for subsequent stacking or baling in preparation for use as fodder. Perhaps equally important is the fact that in doing this, the farmer deposits substantially all of the weed seeds which were harvested along with the grain, at a central location. Subsequent growth of such seeds at a central location makes their control and destruction a relatively simple matter. Use of my apparatus over an extended period of years will enable the farmer to gradually rid his farm of weeds for few if any will be reproduced through self-seeding.

It should be noted in particular that it is not necessary to add auxiliary power to the devices just described in order to practice my invention. However, if it is necessary to do so for any reason, it is certainly contemplated that such a practice may be embodied in my invention. While I have shown a particular embodiment of my invention, I intend to cover all modifications, variations, and changes which may be made by those skilled in the art, in the appended claims and intend to be limited only by the spirit and scope of these claims.

I claim as my invention:

1. Straw conserving apparatus to be used in combination with harvesting apparatus comprising; a combine for combining crops from a field having power driven shaker elements and power driven sieve elements and having a first discharge opening for discharging straw and inert matter and a second discharge opening for discharging grain; a housing having openings therein attached to said first discharge opening for receiving and discharging said straw and inert matter from said combine and having a pluraltiy of knives attached to said housing and positioned in a downwardly sloping direction but spaced vertically relative to said shaker and sieve elements so that said knives are disposed therebetween; a first shaft rotatably mounted in said housing at a point relative to said shaker and sieve elements so that said shaft is vertically disposed therebetween, said shaft having a plurality of knives fixedly attached thereto for rotation therewith to cooperate with said knives attached to said housing and rotate therebetween so that said straw is chopped into small segments; first power transfer apparatus connected between said first shaft and said power driven combine to provide rotational power for said first shaft; a blower attached to one side of said housing to draw said chopper straw and said inert matter laterally across said housing into said blower, said blower discharging said chopped straw and said inert matter in a relatively high pressure stream; second power transfer apparatus connected between said blower and said first shaft to provide rotational power for said blower; transporting means drawn by said combine for receiving said chopper straw and inert matter therewithin and having self-provided power means for depositing the same in a pile so as to cover only a small area of said field, upon said power means being actuated; and flexible conveying means connected between said blower and said transporting means so that said high pressure stream bearing said chopped straw and inert matter is directed into said transporting means.

2. The invention as set forth in claim 1 including a door controllable as to the opening size located on one side of said housing so that the amount of air drawn from said combine into said housing by said blower may be controlled to an optimum value depending on the moisture content of said crops to be harvested.

3. A combine and straw chopping apparatus comprising a combine housing having a front and rear and an opening in the rear of said housing, a substantially horizontal shaker in said combine housing for separating straw and grain, said shaker having its rear end extending over said opening so as to deposit straw into said opening after grain has been separated therefrom, a sieve mounted in said combine housing below said shaker for receiving grain from said shaker and separating it from chaff, grain collecting means below said sieve, a cutter housing secured to said combine housing below said opening so as to close said opening, said cutter housing having an open top communicating with the interior of said combine housing by means of said opening, a substantially horizontal shaft rotatably mounted in and extending transversely across the top of said cutter housing adjacent the rear ends of said shaker and sieve, said shaft being in substantially horizontal alignment with said sieve, a plurality of knives secured to the rear of said cutter housing and extending forwardly therefrom so that rotation of said shaft causes said blades to pass between said knives, said cutter housing including a bottom trough and front and rear walls, said walls converging in a downward direction and merging with the edges of said trough, said front wall having an upper edge adjacent and slightly below the rear end of said sieve, a blower housing mounted on one side of said cutter housing and spaced laterally of said shaker and sieve, said trough sloping downwardly to said blower housing so as to convey straw thereinto, a blower rotatably mounted in said blower housing below said shaft, a trailer for collecting said chaff and straw and dumping it in piles, said trailer coupled to the rear of said combine housing, and straw conveyor means extending from said blower housing to said trailer and arranged so that said blower will force chaff and straw from said blower housing to said conveyor means.

4. Apparatus as defined in claim 3, wherein said trailer includes wall means defining a compartment for receiving and storing chopped straw from said conveyor means, means for moving said wall means to open said compartment and rapidly discharge said chaff and chopped straw from said compartment.

5. Apparatus as defined in claim 4, including adjustable vent means in said chopper housing for regulating the suction thereof caused by said blower whereby chaff will be blown from said sieve into said chopper housing and grain from said sieve will fall into said grain collecting means.

References Cited in the file of this patent

UNITED STATES PATENTS

| | | |
|---|---|---|
| 2,037,491 | Wagoner | Apr. 14, 1936 |
| 2,502,032 | Watson | Mar. 28, 1950 |
| 2,862,536 | Gronberg | Dec. 2, 1958 |
| 2,924,347 | Scott | Feb. 9, 1960 |
| 2,932,145 | Scranton | Apr. 12, 1960 |
| 2,950,747 | Alloway | Aug. 30, 1960 |
| 2,992,750 | Brock | July 18, 1961 |